United States Patent
Varga et al.

(10) Patent No.: US 10,506,380 B2
(45) Date of Patent: Dec. 10, 2019

(54) USER MOTION PROFILING BASED ON USER EQUIPMENT CELL LOCATION

(71) Applicant: Nokia Solutions and Networks Oy, Espoo (FI)

(72) Inventors: Krisztian Zsolt Varga, Budapest (HU); Ferenc Kovacs, Erd (HU); Zoltan Lazar, Pomaz (HU)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/825,670

(22) Filed: Nov. 29, 2017

(65) Prior Publication Data
US 2018/0184254 A1    Jun. 28, 2018

(30) Foreign Application Priority Data

Dec. 22, 2016 (FI) .................................. 20166016

(51) Int. Cl.
*H04W 24/00*      (2009.01)
*H04W 4/029*      (2018.01)
(Continued)

(52) U.S. Cl.
CPC ........ *H04W 4/029* (2018.02); *G06F 16/2477* (2019.01); *G06F 16/285* (2019.01);
(Continued)

(58) Field of Classification Search
CPC .. H04W 4/029; H04W 36/32; G06Q 30/0269; G06Q 30/0242; G06Q 30/0267;
(Continued)

(56) References Cited

U.S. PATENT DOCUMENTS

| 8,412,234 B1 | 4/2013 | Gatmir-Motahari et al. |
| 8,830,909 B1 | 9/2014 | Octeau et al. |

(Continued)

FOREIGN PATENT DOCUMENTS

| JP | 2013509628 A | 3/2013 |
| JP | 2014006842 A | 1/2014 |
| JP | 2016152527 A | 8/2016 |

OTHER PUBLICATIONS

De Mulder, Yoni, et al., "Identification via Location-Profiling in GSM Networks", WPES '08, Oct. 27, 2008, Alexandria, VA, USA, 10 pgs.

(Continued)

*Primary Examiner* — Jonathan L Sample
*Assistant Examiner* — B M M Hannan
(74) *Attorney, Agent, or Firm* — Harrington & Smith

(57) ABSTRACT

Respective location data of a plurality of users are distributed into respective buckets for each of the users. Each of the location data indicates a location of the respective user, and each of the buckets includes a respective time interval. The time intervals cover the time period, and there is a bucket for each of the users for each of the time intervals. For each pair of the users and for each of the time intervals, a respective sub-distance is calculated between the users of the respective pair based on the location data. For each of the pairs of the users, the sub-distances are aggregated over the time period to obtain a distance between the users of the respective pair. The users having a closest distance from each other are clustered.

15 Claims, 10 Drawing Sheets

(51) Int. Cl.
*G06F 16/2458* (2019.01)
*H04L 29/08* (2006.01)
*G06Q 30/02* (2012.01)
*H04W 36/32* (2009.01)
*G06F 16/28* (2019.01)
*G06F 16/29* (2019.01)
*G06F 16/22* (2019.01)

(52) U.S. Cl.
CPC ......... *G06F 16/29* (2019.01); *G06Q 30/0242* (2013.01); *G06Q 30/0269* (2013.01); *H04L 67/18* (2013.01); *H04W 36/32* (2013.01); *G06F 16/2228* (2019.01); *G06Q 30/0256* (2013.01); *G06Q 30/0267* (2013.01)

(58) Field of Classification Search
CPC .......... G06Q 30/0256; G06F 17/30551; G06F 17/30598; G06F 17/30241; G06F 17/30321; H04L 67/18
USPC ................................................ 455/456.1–457
See application file for complete search history.

(56) References Cited

U.S. PATENT DOCUMENTS

| | | | | |
|---|---|---|---|---|
| 8,983,494 | B1* | 3/2015 | Onnen | H04W 4/02 455/422.1 |
| 9,501,507 | B1 | 11/2016 | Harris et al. | |
| 2005/0008097 | A1* | 1/2005 | Tjhung | H03M 13/251 375/302 |
| 2012/0064919 | A1* | 3/2012 | Purdy | G06Q 50/01 455/456.3 |
| 2012/0088525 | A1* | 4/2012 | Kurokawa | H04W 4/021 455/456.5 |
| 2012/0221232 | A1 | 8/2012 | Shang et al. | 701/119 |
| 2013/0005344 | A1 | 1/2013 | Dimou et al. | |
| 2014/0073362 | A1* | 3/2014 | Kawata | G06Q 10/10 455/456.3 |
| 2014/0172576 | A1* | 6/2014 | Spears | G06Q 30/0266 705/14.63 |
| 2015/0193731 | A1* | 7/2015 | Stevens | G06Q 10/083 705/26.7 |
| 2015/0301579 | A1 | 10/2015 | Vaccari et al. | |
| 2016/0069699 | A1* | 3/2016 | Chen | G01C 21/3605 701/426 |
| 2016/0076908 | A1* | 3/2016 | Pang | G06F 16/9537 701/494 |
| 2016/0117732 | A1 | 4/2016 | Zou | |
| 2016/0179874 | A1* | 6/2016 | Lynch | G01C 21/30 707/690 |
| 2016/0180392 | A1 | 6/2016 | Liu et al. | |
| 2016/0239857 | A1 | 8/2016 | Milton et al. | |
| 2017/0109653 | A1* | 4/2017 | Agarwal | G06N 5/025 |
| 2017/0132305 | A1* | 5/2017 | Wang | G06Q 30/02 |
| 2018/0113880 | A1* | 4/2018 | Metcalf-Putnam | G01C 21/3691 |

OTHER PUBLICATIONS

Murat, Ali Bayir, et al., "Mobility Profiler: A Framework for Discovering Mobile User Profiles (Technical Report Version)", Buffalo Edu Tech Reports, 2008, 29 pgs.

* cited by examiner

USER MOTION PROFILING BASED ON USER EQUIPMENT CELL LOCATION

CROSS-REFERENCE TO RELATED APPLICATIONS

The present application claims the benefit under 35 U.S.C. § 119, and any other applicable laws, of application number 20166016, filed in Finland with a filing date of Dec. 22, 2016, the disclosure of which is hereby incorporated by reference in its entirety.

FIELD OF THE INVENTION

The present invention relates to an apparatus, a method, and a computer program product related to user motion profiling. More particularly, the present invention relates to an apparatus, a method, and a computer program product related to user motion profiling based on cell location data.

ABBREVIATIONS

3GPP 3$^{rd}$ Generation Partnership Project
A-GPS Assisted GPS
DB Database
Gb/s Gigabit per second
GPS Global Positioning System
GSM Global System for Mobile Communication
GUI Graphical User Interface
MNO Mobile Network Operator
PoC Proof of Concept
POI Point of Interest
SMS Short Message Service

BACKGROUND OF THE INVENTION

It is not a trivial matter to locate users and their movements with fine granularity from mobile activity alone. Most positioning systems use GPS with A-GPS support (or a similar satellite system) to actively monitor the location of the device. However for a mobile operator it is not really an option to actively monitor every user for several reasons:
  In almost all cases GPS data is only available in the user's mobile device which the operator simply has no access to;
  Forcefully pushing down an application to the users mobile device can be a hard privacy bargain to sell;
  Even if users agree, developing and maintaining applications for all mobile types is costly;
  Not to mention that constant active positioning is battery-draining and leads to worse user experience.
Some prior art in this field is as follows:
*Identification via Location-Profiling in GSM Networks* (2008) Yoni De Mulder, George Danezis, Lejla Batina, Bart Preneel
In this paper, the authors used simple first-order markov chains and hierarchical clustering to profile the users' movement from GSM location data. They claim 80% accuracy for user identification from these profiles in a subsequent period and that information gathered in one month is so rich that it can be used to identify users for a long time after.
An online PDF version is available at: www0.cs.ucl.ac.uk/staff/G.Danezis/papers/GSMLocation-profile.pdf
*Mobility Profiler: A Framework for Discovering Mobile User Profiles* (2008) Ali Murat, Demirbas Murat, Eagle Nathan
This paper introduces a complete mobility profiler framework also handling problems such as celltower oscillations (i.e. ping-pongs). They construct cell mobility paths and reduce ping-pongs by identifying repeatedly oscillating cell pairs and convert them to cell clusters. Afterwards, they used sequential a priori algorithm to filter out and evaluate dominant patterns. These patterns will build up the mobility profile of that user.
Online PDF version: www.cse.buffalo.edu/tech-reports/2008-17.pdf

SUMMARY OF THE INVENTION

It is an object of the present invention to improve the prior art.

According to a first aspect of the invention, there is provided an apparatus, comprising at least one processor, at least one memory including computer program code, and the at least one processor, with the at least one memory and the computer program code, being arranged to cause the apparatus to at least perform at least distributing respective location data of a plurality of users into respective buckets for each of the users, wherein each of the location data indicates a location of the respective user at a time during a predetermined time period, each of the buckets includes a respective time interval of the time period, the time intervals do not overlap and cover the time period, the time intervals are the same for all of the users, and there is a bucket for each of the users for each of the time intervals; calculating, for each pair of the users and for each of the time intervals, a respective sub-distance between the users of the respective pair based on the location data in the respective buckets; aggregating, for each of the pairs of the users, the sub-distances over the time period to obtain a distance between the users of the respective pair; clustering the users having a closest distance from each other in order to obtain respective clusters of the users.

The location data may be handover data obtained from a communication network and/or wherein the location data may be data obtained from a positioning system.

The sub-distances $d(C_{1,i}, C_{2,i})$ between a user 1 and a user 2 of the users at the time interval i may be calculated by one of the following formulas:

$$d(C_{1,i}, C_{2,i}) = 1 - \frac{|C_{1,i} \cap C_{2,i}|}{|C_{1,i} \cup C_{2,i}|} \text{ and}$$

$$d(C_{1,i}, C_{2,i}) = 1 - \frac{|C_{1,i} \cap C_{2,i}|}{\sqrt{|C_{1,i}| \cdot |C_{2,i}|}}$$

wherein $C_{1,i}$ and $C_{2,i}$ denote a set of the location data in the bucket of the time interval i of the user 1 and the user 2, respectively, $\cap$ denotes an intersection operator, $\cup$ denotes a union operator, and |.| denotes a cardinality of the respective set.

The clustering may be made by agglomerative hierarchical clustering.

The at least one processor, with the at least one memory and the computer program code, may be arranged to cause the apparatus to further perform checking if a number of the users in the respective cluster is larger than a predetermined number; determining a first cell where the number of the users in the respective cluster is larger than the predetermined number; providing an information to the users via cell broadcast in the first cell if the number of the users in the respective cluster is larger than the predetermined number; and providing the information to the users by a dedicated message if the number of the users in the respective cluster is not larger than the predetermined number.

The at least one processor, with the at least one memory and the computer program code, may be arranged to cause the apparatus to further perform checking if a number of the users in the respective cluster is larger than a predetermined number; determining a second cell where the number of the users in the respective cluster is larger than the predetermined number; increasing a capacity of the second cell if the number of the users in the respective cluster is larger than the predetermined number.

According to a second aspect of the invention, there is provided an apparatus, comprising at least one processor, at least one memory including computer program code, and the at least one processor, with the at least one memory and the computer program code, being arranged to cause the apparatus to at least perform at least distributing cell data of a plurality of users into respective buckets for each of the users, wherein each of the cell data indicates a cell where the user was located at a time during a predetermined time period, each of the buckets includes a respective time interval of the time period, the time intervals do not overlap and cover the time period, the time intervals are the same for all of the users, and there is a bucket for each of the users for each of the time intervals; calculating an average position of each of the users for each of the time intervals based on the cell data in the respective bucket; determining, for each of the users and for each of the time intervals, a velocity of the respective user as a ratio of a difference of the average position at a time interval subsequent to the respective time interval and the average position of the respective time interval and a duration of the time interval; clustering the users having respective velocities close to the respective velocities of another of the users over the time intervals of the time period in order to obtain respective clusters of the users.

At least one of the average positions may be calculated as a centroid of geolocations of the cells where the user was located during the respective time interval.

The clustering may be made by k-means unsupervised clustering.

According to a third aspect of the invention, there is provided an apparatus, comprising at least one processor, at least one memory including computer program code, and the at least one processor, with the at least one memory and the computer program code, being arranged to cause the apparatus to at least perform at least determining, for each of one or more cells, a respective duration during which a user was located in the respective cell during a predetermined time period; calculating an average location of the user from a weighted average of geolocations of the cells in which the user was located during the time period, wherein the weights of each of the locations is based on the duration during which the user was located in the respective cell.

At least one of the durations may be determined as the time interval between a second time when the user performed a second handover from the respective cell and a first time when the user performed a first handover to the respective cell.

At least one of the weights may be additionally based on a size of the respective cell.

The at least one processor, with the at least one memory and the computer program code, may be arranged to cause the apparatus to further perform checking is a first billboard is close to the average location; adapting a content shown on the first billboard according to an interest of the user if the first billboard is close to the average location.

The at least one processor, with the at least one memory and the computer program code, may be arranged to cause the apparatus to further perform checking is a second billboard is close to the average location; placing the second billboard close to the average location if the second billboard is not close to the average location.

According to a fourth aspect of the invention, there is provided a method, comprising distributing respective location data of a plurality of users into respective buckets for each of the users, wherein each of the location data indicates a location of the respective user at a time during a predetermined time period, each of the buckets includes a respective time interval of the time period, the time intervals do not overlap and cover the time period, the time intervals are the same for all of the users, and there is a bucket for each of the users for each of the time intervals; calculating, for each pair of the users and for each of the time intervals, a respective sub-distance between the users of the respective pair based on the location data in the respective buckets; aggregating, for each of the pairs of the users, the sub-distances over the time period to obtain a distance between the users of the respective pair; clustering the users having a closest distance from each other in order to obtain respective clusters of the users.

The location data may be handover data obtained from a communication network and/or wherein the location data may be data obtained from a positioning system.

The sub-distances $d(C_{1,i}, C_{2,i})$ between a user 1 and a user 2 of the users at the time interval i may be calculated by one of the following formulas:

$$d(C_{1,i}, C_{2,i}) = 1 - \frac{|C_{1,i} \cap C_{2,i}|}{|C_{1,i} \cup C_{2,i}|} \text{ and}$$

$$d(C_{1,i}, C_{2,i}) = 1 - \frac{|C_{1,i} \cap C_{2,i}|}{\sqrt{|C_{1,i}| \cdot |C_{2,i}|}}$$

wherein $C_{1,i}$ and $C_{2,i}$ denote a set of the location data in the bucket of the time interval i of the user 1 and the user 2, respectively, $\cap$ denotes an intersection operator, $\cup$ denotes a union operator, and |.| denotes a cardinality of the respective set.

The clustering may be made by agglomerative hierarchical clustering.

The method may further comprise checking if a number of the users in the respective cluster is larger than a predetermined number; determining a first cell where the number of the users in the respective cluster is larger than the predetermined number; providing an information to the users via cell broadcast in the first cell if the number of the users in the respective cluster is larger than the predetermined number; and providing the information to the users by a dedicated message if the number of the users in the respective cluster is not larger than the predetermined number.

The method may further comprise checking if a number of the users in the respective cluster is larger than a predetermined number; determining a second cell where the number of the users in the respective cluster is larger than the predetermined number; increasing a capacity of the second cell if the number of the users in the respective cluster is larger than the predetermined number.

According to a fifth aspect of the invention, there is provided a method, comprising distributing cell data of a plurality of users into respective buckets for each of the users, wherein each of the cell data indicates a cell where the user was located at a time during a predetermined time period, each of the buckets includes a respective time interval of the time period, the time intervals do not overlap and cover the time period, the time intervals are the same for all of the users, and there is a bucket for each of the users for each of the time intervals; calculating an average position of each of the users for each of the time intervals based on the cell data in the respective bucket; determining, for each of the users and for each of the time intervals, a velocity of the respective user as a ratio of a difference of the average position at a time interval subsequent to the respective time interval and the average position of the respective time interval and a duration of the time interval; clustering the users having respective velocities close to the respective velocities of another of the users over the time intervals of the time period in order to obtain respective clusters of the users.

At least one of the average positions may be calculated as a centroid of geolocations of the cells where the user was located during the respective time interval.

The clustering may be made by k-means unsupervised clustering.

According to a sixth aspect of the invention, there is provided a method, comprising determining, for each of one or more cells, a respective duration during which a user was located in the respective cell during a predetermined time period; calculating an average location of the user from a weighted average of geolocations of the cells in which the user was located during the time period, wherein the weights of each of the locations is based on the duration during which the user was located in the respective cell.

At least one of the durations may be determined as the time interval between a second time when the user performed a second handover from the respective cell and a first time when the user performed a first handover to the respective cell.

At least one of the weights may be additionally based on a size of the respective cell.

The method may further comprise checking is a first billboard is close to the average location; adapting a content shown on the first billboard according to an interest of the user if the first billboard is close to the average location.

The method may further comprise checking is a second billboard is close to the average location; placing the second billboard close to the average location if the second billboard is not close to the average location.

Each of the methods according to the fourth to sixth aspects may be a method of user motion profiling.

According to a seventh aspect of the invention, there is provided a computer program product comprising a set of instructions which, when executed on an apparatus, is configured to cause the apparatus to carry out the method according to any of the fourth to sixth aspects. The computer program product may be embodied as a computer-readable medium or directly loadable into a computer.

According to some example embodiments of the invention, at least one of the following technical effects may be provided:
  determining which users typically commute together;
  determining the time of the day when lots of a user commute;
  determining stationary areas such as home location and/or work location of the users.

BRIEF DESCRIPTION OF THE DRAWINGS

Further details, features, objects, and advantages are apparent from the following detailed description of example embodiments of the present invention which is to be taken in conjunction with the appended drawings, wherein.

DETAILED DESCRIPTION OF CERTAIN EXAMPLE EMBODIMENTS

Figure 1:
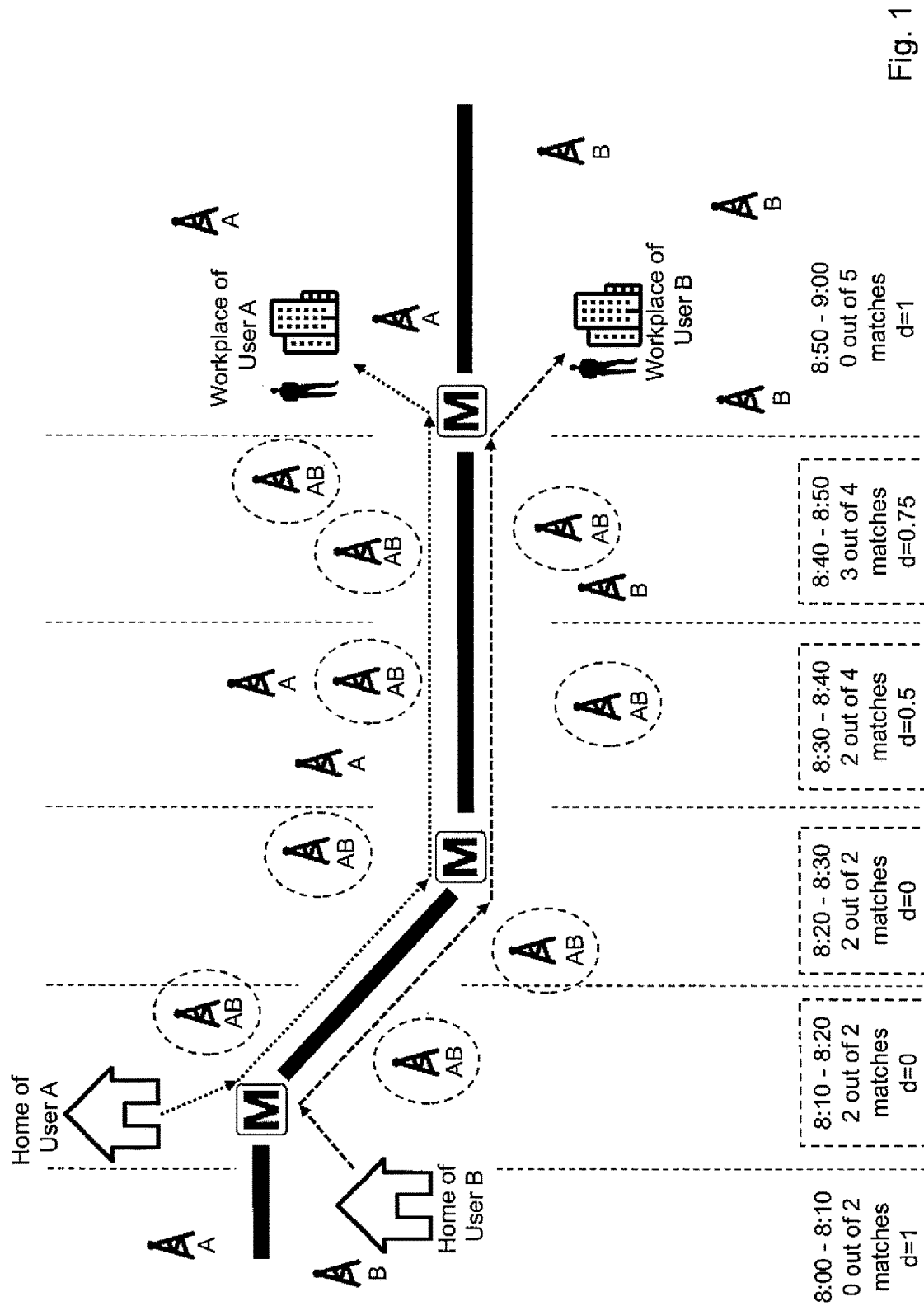
FIG. 1 shows distance calculation in the "commuting together" scenario according to some embodiments of the invention.

Herein below, certain example embodiments of the present invention are described in detail with reference to the accompanying drawings, wherein the features of the example embodiments can be freely combined with each other unless otherwise described. However, it is to be expressly understood that the description of certain embodiments is given for by way of example only, and that it is by no way intended to be understood as limiting the invention to the disclosed details.

Moreover, it is to be understood that the apparatus is configured to perform the corresponding method, although in some cases only the apparatus or only the method are described.

Through machine learning and statistic analytical methods, some embodiments of the invention conduct profiling of the daily user routine out of cell handover data. This added information can provide valuable information both for the operator and for third parties such as advertisement companies or advertisement brokers, especially in the online advertisement ecosystem. Some other potential uses of this knowledge may include urban planning or emergency response prediction in case of an epidemic.

Some embodiments of the invention use cell handover data from the mobile operator side, so there is no need for any client-side application. Some of the embodiments may give an answer to at least one of the following questions:

1. which users are commuting together to work?
2. what are the users' daily movement patterns (commute/lunch/going home time intervals)?
3. what are stationary areas (e.g. the home and/or working area(s) and/or POIs) of the user?

In the following, it is described for each of these questions how they are answered according to some embodiments of the invention. Note that a single embodiment of the invention may be configured to answer one, two, or three of these questions.

The following pipeline was used during the work:
1. Formulate a question that might be relevant and extend our knowledge about the mobile network users. E.g.: Who commutes together?
2. Clean the data to have achieve better quality. E.g.: Filter out the items that are noise such as the ping pong effects from the handover data.
3. Define distance/similarity measure(s), which is able to compare the users concerning to the question. E.g.: Ratio of the common and different cells in a certain period of time.
4. Choose a clustering algorithm, which fits to the problem statement and distance function, e.g.: Hierarchical clustering.
5. Validate result and refine parameters or distance measures, e.g.: result visualization.

A particular focus of the invention is on the first 3 items of this pipeline.

Commuting Together

The output of this function are groups of people with common daily moving patterns regarding time and place. This means that each group will have users who are moving together day-by-day in similar locations at similar times. An example of such a group may be the passengers of a commuter's train.

In order to create these groups, first the daily cell/location data of each user are gathered. Assume each user has a list of (cell, timestamp) tuples. This can be easily accessed through probing the MNO's traffic.

TABLE 1

Gathered data for each user

| User A | Cell$_1$, Date$_1$ | Cell$_2$, Date$_2$ | ... | Cell$_n$, Date$_n$ |
| User B | Cell$_1$, Date$_1$ | Cell$_2$, Date$_2$ | ... | Cell$_m$, Date$_m$ |
| ... | | | | |

First, we convert the timestamp into time of day data (essentially throwing away the date part), and cut the whole day into a fixed number of windows (slots/buckets). For example, we use 10 minute long windows, generating 144 buckets (since there are 1440 minutes a day). After this, we organize the data of the users so that we put their cells into each bucket according to their timestamp. This part is useful since this averaging does not only reduce our data, it also cancels out most of the cell tower oscillations a.k.a. ping pangs.

Note that in our implementation we used 10 minute windows but other length can also be appropriate; but we have to consider that too long windows will generate coarse results and too short windows are more prone to noise.

Also, in the present embodiment, daily movement patterns are considered such that the time of the day is sufficient information. However, if other movement periods (e.g. weekly, monthly, or yearly) are to be identified, the time information should comprise e.g. information the day. Contrary, if hourly movement periods are to be identified, information on the hour may be omitted.

After the conversion we have the following Table 2:

TABLE 2 cell information for each user distributed in buckets

| | 1 (00:00-00:10) | 2 (00:10-00:20) | ... | 144 (23:50-00:00) |
| User A | Cell$_1$, Cell$_2$, Cell$_3$ | Cell$_1$, Cell$_2$ | ... | Cell$_1$, Cell$_2$, Cell$_3$ |
| User B | Cell$_1$, Cell$_2$ | Cell$_1$, Cell$_2$, Cell$_3$ | ... | Cell$_1$, Cell$_2$, Cell$_3$ |
| ... | | | | |

We can now define a distance function that calculates a [0 . . . 1] value between two users in each time window. Assume we have two users: $U_1$, $U_2$ with and $C_{1,i}$, $C_{2,i}$ sets where i=1, 2, . . . , 144 (the number of slots) containing the cell set. We will calculate the (sub-)distance between two users in a specific time slot i using Formula 1. Alternatively Formula 2 can also be used instead as it produces superior results in some cases.

Formula 1 (distance by intersection ratio):

$$d(C_{1,i}, C_{2,i}) = 1 - \frac{|C_{1,i} \cap C_{2,i}|}{|C_{1,i} \cup C_{2,i}|}$$

Formula 2 (distance by Ochiai coefficient):

$$d(C_{1,i}, C_{2,i}) = 1 - \frac{|C_{1,i} \cap C_{2,i}|}{\sqrt{|C_{1,i}| \cdot |C_{2,i}|}}$$

Herein, $C_{1,i}$ and $C_{2,i}$ denote a set of the location data in the bucket of the time interval i of the user 1 and the user 2, respectively, $\cap$ denotes an intersection operator, $\cup$ denotes a union operator, and |.| denotes a cardinality of the respective set.

Note: in the special case of denominator is zero in any of the formulas, we use d=1.

Other metrics than these were not successful in identifying users travelling together.

Finally, we can aggregate these sub-distances $d(C_{1,i}, C_{2,i})$ using normalized Euclidian distance in order to obtain a distance $d(U_1, U_2)$ between the two users:

$$d(U_1, U_2) = \sqrt{\frac{1}{144} \cdot \sum_{i=1}^{144} d(C_{1,i}, C_{2,i})^2}$$

FIG. 1 illustrates the idea of the distance calculation (according to formula 1):

The dashed and dotted lines represent the two users movements, and the base stations are encircled, if they are present in both of the users' time window, and not encircled if only present in one of the two users' time window. By the letters "A" and "B", it is indicated for each of the base stations for which user they are present in the respective time window. We can see on the figure how the number of common cells increases as the users are sharing a common route (i.e. a train or metro car), and how the sub-distances are calculated.

So we calculate distances between each user pair to obtain a distance matrix, as shown in Table 3:

TABLE 3

Distance matrix indicating distances between each pair of users.

|       | $U_1$ | $U_2$      | ... | $U_N$       |
|-------|-------|------------|-----|-------------|
| $U_1$ | 0     | $d(U_1, U_2)$ | ... | $d(U_1, U_n)$ |
| $U_2$ | —     | 0          | ... | $d(U_2, U_n)$ |
| ...   | —     | —          | 0   | ...         |
| $U_N$ | —     | —          | —   | 0           |

Note that this is not a valid Euclidian space since the triangle inequity theorem cannot be applied, so we cannot use K-means or similar algorithms here. Instead we will use an agglomerative hierarchical clustering method to join the users who have low distance to each other (Hierarchical clustering: see/en.wikipedia.org/wiki/Hierarchical_clustering).

At the first phase, all users have their own cluster, and in each step, the algorithm merges the two closest clusters, creating a new cluster with the union of the users of the original two clusters. This step is repeated until a given distance threshold is reached. The identification of the appropriate threshold level is deeply investigated in hierarchical clustering. For implementation, we were using a Python implementation: scipy.cluster.hierarchy of this clustering method (docs.scipy.org/doc/scipy/reference/cluster.hierarchy.html), in 'single' agglomerative routine mode.

Figure 2:
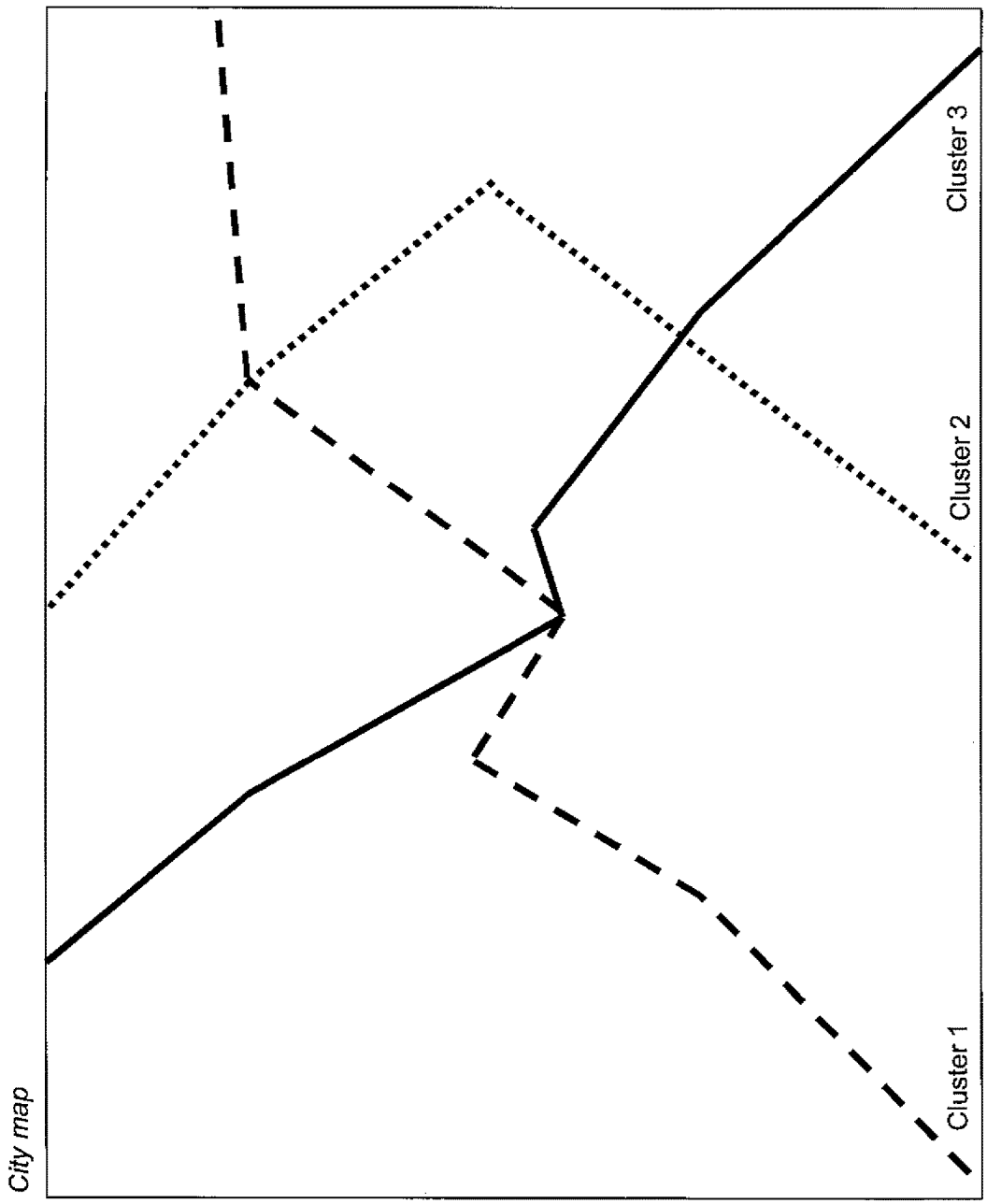
FIG. 2 shows trails of users commuting together, wherein groups of users bare differentiated by line types.

The output of this clustering are the groups that can be seen in the city map of FIG. 2 based on real data. Herein, groups of users are differentiated by different line types. The minimum and maximum number of users per group depends on the application area.

As an example application according to some embodiments of the invention, the system analyses for a certain user if he belongs to a commuter group. If not, some advertisement will be sent to the user by dedicated message (e.g. SMS or in a dedicated app). However, if the user belongs to a commuter group of sufficient size (number of members), the advertisement may be sent by cell broadcast to these commuters in a cell where the commuters commute together. Thus, network load is reduced.

Some other example applications according to some embodiments of the invention are:
  Providing advertisements (ads) or a discount coupon to a user based his/her daily travelling routine.
  changing the network behavior
    optimize bandwidth for the commuters, since they are likely to use their phone during that time
    optimize network for known trajectories of users (common commuting routes)
  disease outbreak prediction (likely routes of contamination): People commuting together and staying together may be labelled as potentially affecting each other. This information may be used for separating people and save them. Thus, spread of a disease may be prevented or slowed down.

Daily Movement Patterns

According to some embodiments of the invention, this function analyses user movement intensity over time-of-day. Unlike the function commuting together, the movement location does not matter here, only the temporal traveling distance (speed). This is useful to catch people that are commuting or going for lunch or going home at the same time of day. Fortunately it is also likely that the people will read the news or surf on the internet through their phones during traveling.

Figure 3:
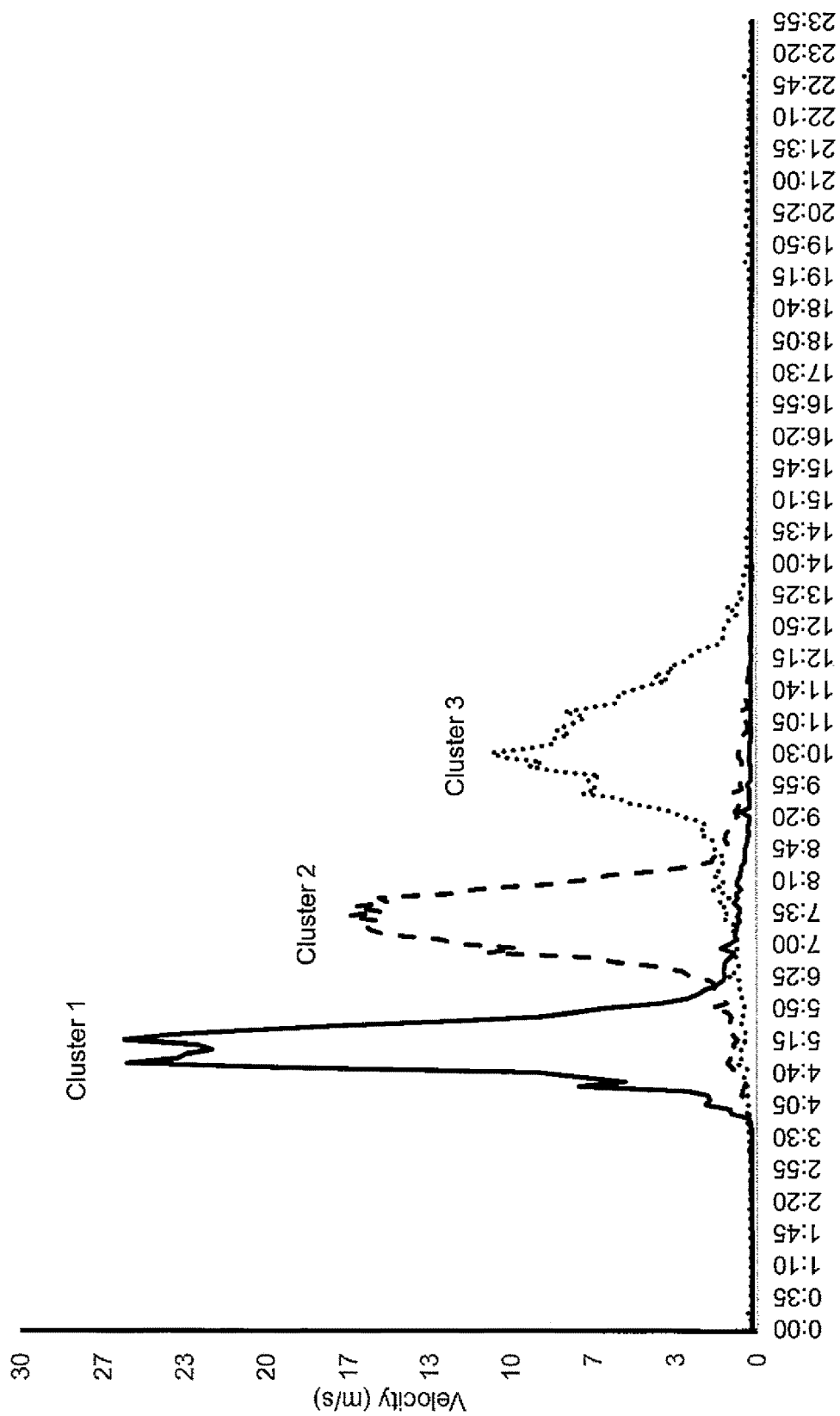
FIG. 3 shows commuting patterns, differentiated by line types.

FIG. 3 illustrates commuting patterns: For each time of a day (in steps of 10 minutes, x-axis), the number of users travelling with a velocity larger than a predefined minimum value is shown.

Aside from some fuzzy patterns we can already see how some people are going to work for 5, 6, 7, 8, 9 or 10 AM in different motion patterns. The patterns for going home are not visible here, probably because it varies more from person to person even in the case of users in the same morning commuting group. Still, the detection of lunch and going home patterns can also be addressed using time filtering.

The underlying algorithm is similar to the function commuting together discussed hereinabove. We use time-of-day converted handovers arranged into 10 minute long slots for each user:

TABLE 4

User cells distributed in buckets

|      | 1 (00:00-00:10)                                    | 2 (00:10-00:20)              | ... | 144 (23:50-00:00)                                  |
|------|----------------------------------------------------|------------------------------|-----|----------------------------------------------------|
| User | Cell$_1$, Cell$_2$, Cell$_3$                       | Cell$_1$, Cell$_2$           | ... | Cell$_1$, Cell$_2$, Cell$_3$                       |

We then convert the cells into geolocation in each window using the following manner: we take each cell's geolocation (e.g., the location of the base station, or a center of the coverage area of the cell) as a point on a map and calculate a centroid using these points. In the end we will have the centroid. This method is useful to reduce the ping-pong handover phenomenon, where rapid change of cells might generate noise due to environmental circumstances (i.e. moving bus blocks the current cell station and the mobile equipment switches to another one until the bus gets out of the way).

TABLE 5

Approximate user locations per bucket

|      | 1 (00:00-00:10) | 2 (00:10-00:20) | ... | 144 (23:50-00:00)   |
|------|-----------------|-----------------|-----|---------------------|
| User | Centroid$_1$    | Centroid$_2$    | ... | Centroid$_{144}$    |

From this information we can interpolate the movement speed from the distance between the centroids over the time between each pair of neighbored windows (buckets). Suppose each centroid consists of a latitude (lat) and a longitude (lon) coordinates, we can calculate the approximated speed $v_{i,i+1}$ in m/s using between two time windows using following formula:

$$v_{i,i+1} = \frac{\sqrt{(lat_i - lat_{i+1})^2 + (lon_i - lon_{i+1})^2}}{600}$$

Here, the denominator 600 is chases because each bucket comprises data of 10 minutes=600 seconds. Of course, the buckets may have a different duration and the denominator will then be adjusted accordingly.

Now we have the following table, which we can use as an input for k-means unsupervised clustering (since these values are valid for a 144-dimension Euclidian space):

TABLE 6

| User velocities per bucket | | | |
|---|---|---|---|
| 1 (00:00-00:10) | 2 (00:10-00:20) | ... | 144 (23:50-00:00) |
| User $v_{1,2}$ | $v_{2,3}$ | ... | $v_{144,1}$ |

K-means is a well-known fundamental clustering method in unsupervised learning. More information regarding k-means clustering can be found at en.wikipedia.org/wiki/K-means_clustering. In the PoC we were using scipy.cluster.vq.kmeans (docs.scipy.org/doc/scipy/reference/generated/scipy.cluster.vq.kmeans.html) class to do the calculations. We created 10 clusters, whereof 3 are shown in FIG. 3. The output of the clustering can be used to categorize each user to the closest matching pattern.

Stationary Areas (e.g. Home/Working Area and POIs)

According to some embodiments of the invention, this function detects a stationary area such as a POI and/or home/working area of a specific user. The input data is again extracted from cell handovers. For the example of home/working area, we define two fixed intervals: 9 PM-5 AM and 10 AM-4 PM, respectively, when people with regular daily pattern will usually be either at home or at work (or school/university for students). For such people this will be true for most of the weekdays and thus we can use this assumption to predict their usual home/work locations (this can be adjusted to different countries based on local habits, or to different POIs depending on the expected behavior of the user in time).

First we acquire all handover target cells in these time intervals and assign a weight. For example, the weight may be the time elapsed before the next handover (practically the time the mobile spent in that specific cell). If we calculate a weighted average on the geolocations of these handover cells, we get the most relevant location for each time interval, and thus we will get the home/work location approximations.

In detail, in some embodiments of the invention, let h be a handover, w(h) the weight of the handover, ts(h) the timestamp attribute of the handover. We calculate the weight w(h) so that:

$$w(h_{current}) = ts(h_{next}) - ts(h_{current})$$

where next is the next known handover in line for the given user. Let geo(h) be the 2-dimensional geolocation of the target cell in the handover and $H_{home}$ a filtered set of the users handovers according to the assumed home time interval (9 PM-5 AM). Now we calculate home location via:

$$loc_{home} = \frac{\sum_{i \in H_{home}} geo(h_i) \cdot w(h_i)}{\sum_{i \in H_{home}} w(h_i)}$$

The work location or a POI may be calculated similarly.

The weight may not only be based on the duration while the user is in a specific cell, but may also involve other parameters. For example, a cell with a small area may have a higher weight than a cell with a large area. This may be expressed e.g. as an additional weighting factor inverse proportional to the area of the cell. Thus, it may be reflected that a user may be only shortly in a small cell but the location of the user is determined with high accuracy during this time.

The geolocation of a cell may be determined in the same way as described for the scenario Daily movement patterns.

Figure 4:
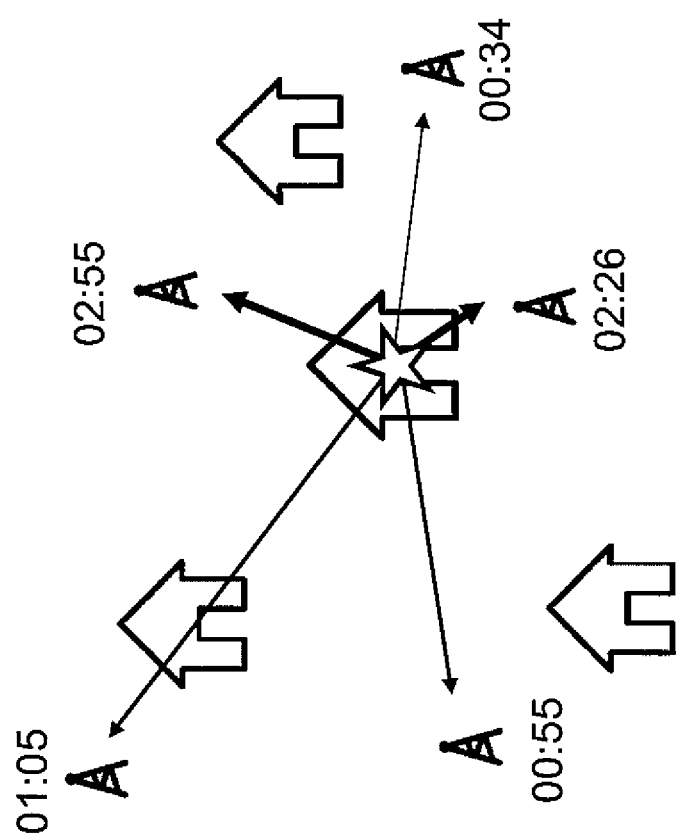
FIG. 4 shows an example visualization of an approximated home location according to some embodiments of the invention.

FIG. 4 shows an example visualization of an approximated home location. The times indicated at the base station indicate when the user performed handover to the respective cell. The star indicates the location which is calculated from the weighted geolocations of these cells. As may be seen, the calculated location is quite close to the real location (indicated by the large house, whereas other locations are indicated as small houses).

Thus, the results of the daily movement patterns are used to detect stationary time periods individually to fit to people with irregular working times. We can use weighted average in these stationary periods to detect the locations where the user stays for longer time—usually this is either the workplace or home location.

As an application example, one may put dynamic content on real-life digital billboards according to the profile of the people crossing by are staying for a certain time at a certain location (i.e., a POI, home location, work location, etc.). If interests of the users are known, one may adapt the content (e.g. advertising, public transport timetable, news, or information on traffic jams) to these interests. Even more, one may place the billboards based on the knowledge of stationary areas of the users.

A corresponding application example may use the location information of the "commuting together" scenario described hereinabove in order to place or control digital billboards along the routes of the commuters.

Proof of Concept

Figure 5:
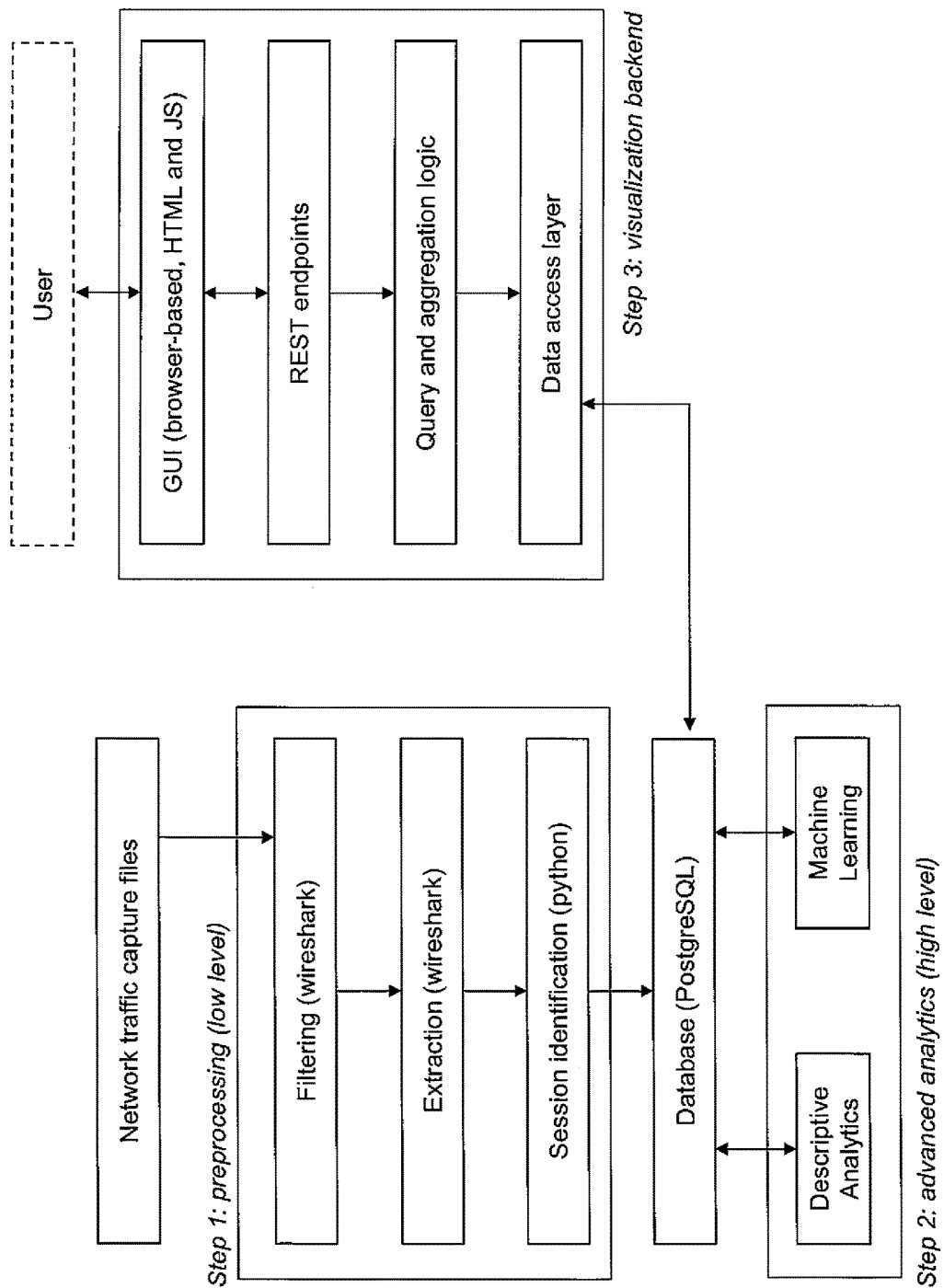
FIG. 5 shows an architecture of a proof of concept according to some embodiments of the invention.

The above described algorithms can be implemented in practically any language, although it is more feasible for languages that already have machine learning related libraries than can be used out of the box (such as Python). Our proof of concept was done mainly using Python, Wireshark and PostgreSQL. The architecture can be seen in FIG. 5:

Our test data consisted of raw packet capture files from S5/S11/S1U interfaces containing gateway handovers and user plane related data. From the control plane data, the users and their handovers were extracted, correlated and written to a database. A list of cell geolocations were also uploaded into the database, from which we could estimate user locations. There is also a GUI implemented to visualise the results of the analysis, including the algorithms described hereinabove for some embodiments of the invention. This PoC is good for feature demonstration, and using Python was a great help for achieving rapid development.

Figure 6:
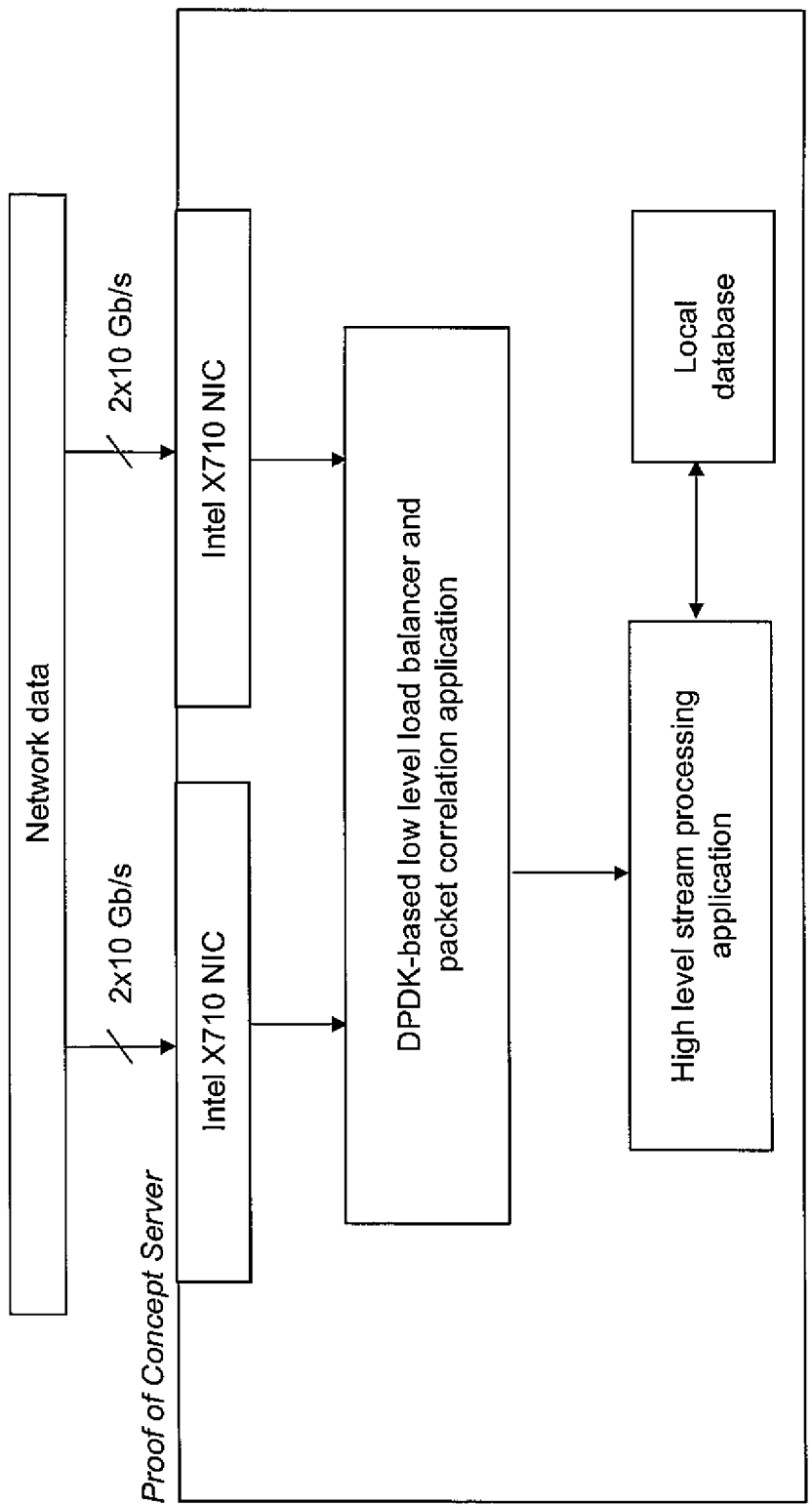
FIG. 6 shows an architecture of a single server architecture according to some embodiments of the invention.

For a real product, using of big data-ready languages and frameworks is recommendable. A single-server deployment architecture can be seen in FIG. 6.

This solution aims to achieve processing of 40 Gb/s packet data from S5/S11/S1U interfaces. The correlation engine conducts control plane and user plane matching and the user handovers are forwarded to the classification and model builder engine that is written using Spark Streaming. Spark Streaming is a popular batch stream processing engine that runs on Apache Spark. According to our current estimations, handling of 40 Gb/s telco network data can be achieved by using a single server instance.

Figure 7:
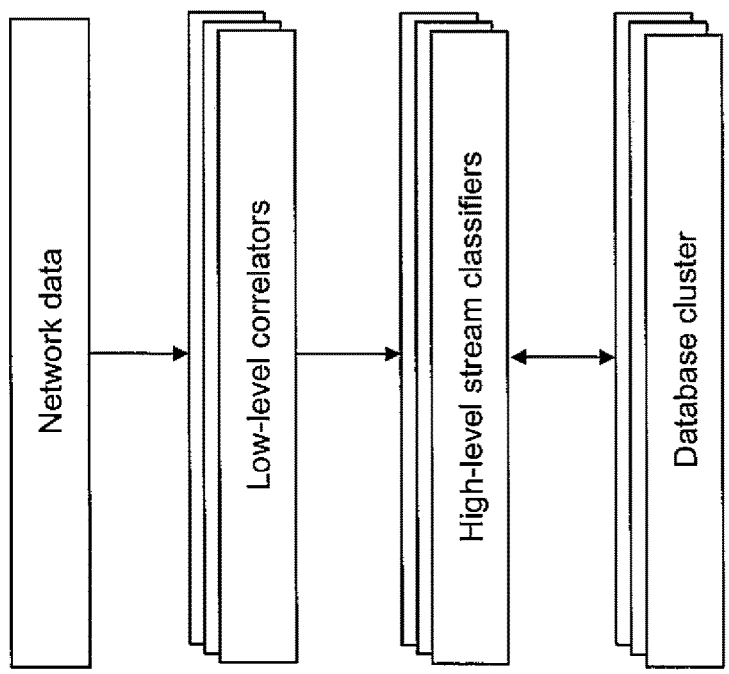
FIG. 7 shows a scalable architecture of a proof of concept according to some embodiments of the invention.

However, thanks to Spark, this solution should be easily scalable. The future plans for >40 Gb/s PoCs can be seen in FIG. 7.

Figure 9:
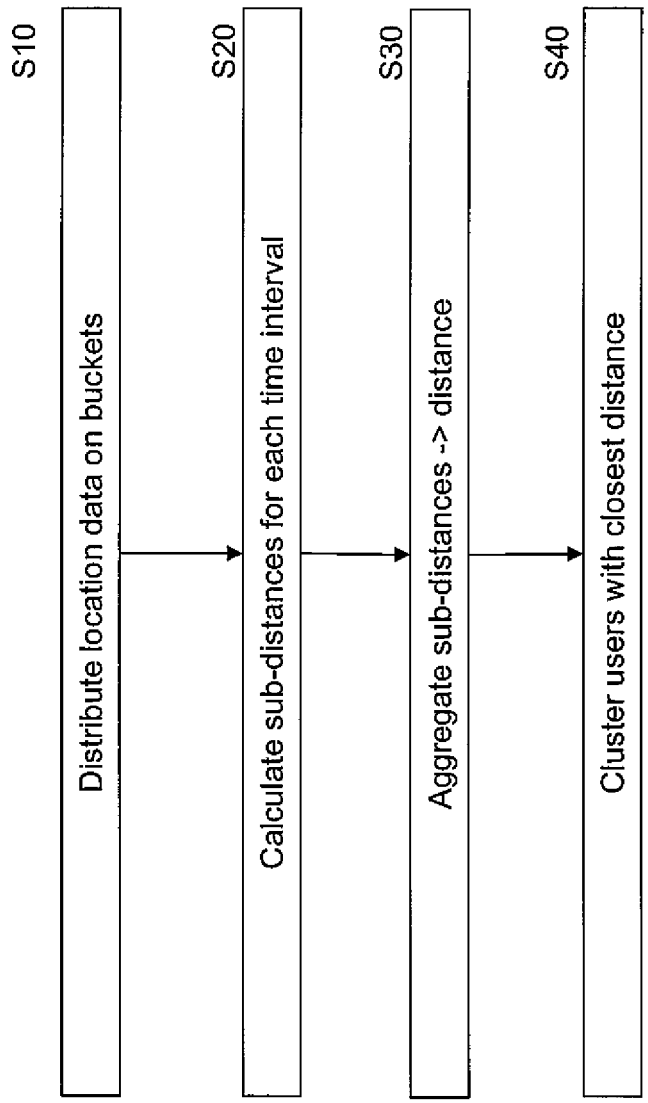
FIG. 9 shows a method according to an example embodiment of the invention.
Figure 8:
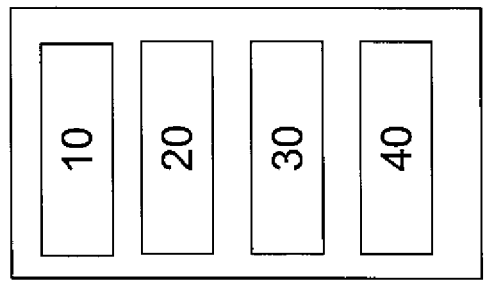
FIG. 8 shows an apparatus according to an example embodiment of the invention.

FIG. 8 shows an apparatus according to an example embodiment of the invention. The apparatus may be a computer or an element thereof. FIG. 9 shows a method according to an example embodiment of the invention. The apparatus according to FIG. 8 may perform the method of FIG. 9 but is not limited to this method. The method of FIG. 9 may be performed by the apparatus of FIG. 8 but is not limited to being performed by this apparatus.

The apparatus comprises distributing means 10, calculating means 20, aggregating means 30, and clustering means 40. The distributing means 10, calculating means 20, aggregating means 30, and clustering means 40 may be distributing circuitry, calculating circuitry, aggregating circuitry, and clustering circuitry, respectively.

The distributing means 10 distributes respective location data of a plurality of users into respective buckets for each of the users (S10). Each of the location data indicates a location of the respective user at a time. The time is during a predetermined time period such as a day. Each of the buckets includes a respective time interval (e.g. 10 minutes) of the time period. The time intervals do not overlap and cover the time period. The time intervals are the same for all of the users, and there is a bucket for each of the users for each of the time intervals.

The calculating means 20 calculates, for each pair of the users and for each of the time intervals, a respective sub-distance between the users of the respective pair based on the location data in the respective buckets (S20).

The aggregating means 30 aggregates, for each of the pairs of the users, the sub-distances over the time period (e.g. a day) (S30). Thus, a distance between the users of the respective pair is obtained.

The clustering means 40 clusters the users having a closest distance from each other in order to obtain respective clusters of the users (S40).

Figure 11:
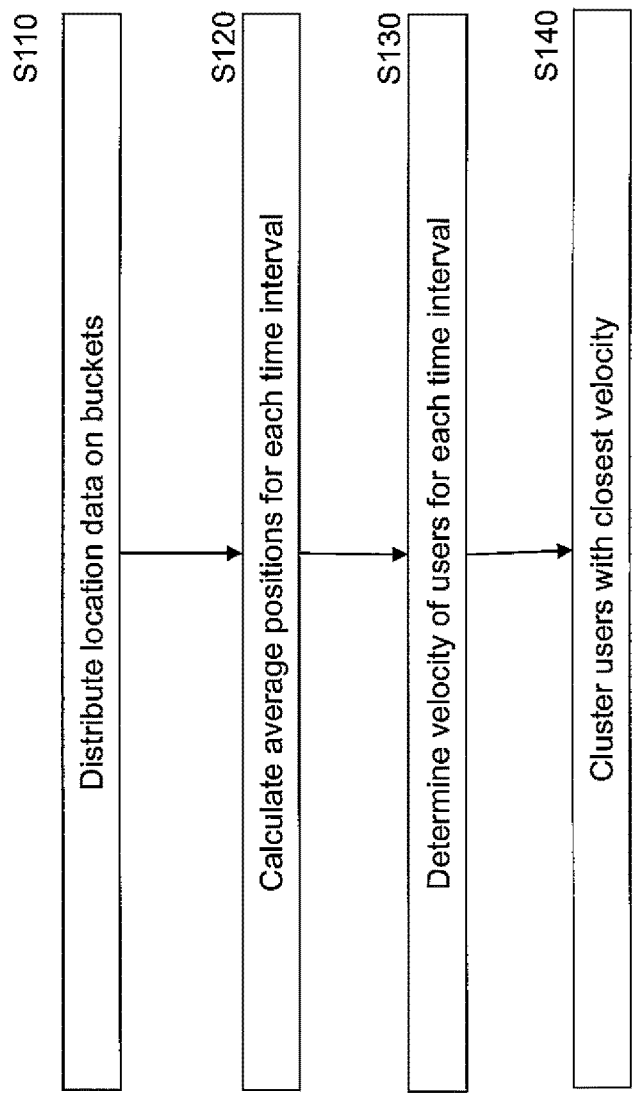
FIG. 11 shows a method according to an example embodiment of the invention.
Figure 10:
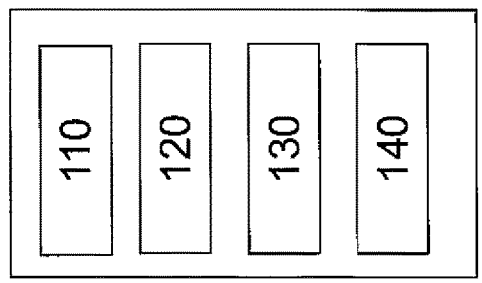
FIG. 10 shows an apparatus according to an example embodiment of the invention.

FIG. 10 shows an apparatus according to an example embodiment of the invention. The apparatus may be a computer or an element thereof. FIG. 11 shows a method according to an example embodiment of the invention. The apparatus according to FIG. 10 may perform the method of FIG. 11 but is not limited to this method. The method of FIG. 11 may be performed by the apparatus of FIG. 10 but is not limited to being performed by this apparatus.

The apparatus comprises distributing means 110, calculating means 120, determining means 130, and clustering means 140. The distributing means 110, calculating means 120, determining means 130, and clustering means 140 may be a distributing circuitry, calculating circuitry, determining circuitry, and clustering circuitry, respectively.

The distributing means 110 distributes cell data of a plurality of users into respective buckets for each of the users (S110). Each of the cell data indicates a cell where the user was located at a time during a predetermined time period, e.g. a day. Each of the buckets includes a respective time interval (e.g. 10 minutes) of the time period. The time intervals do not overlap and cover the time period. The time intervals are the same for all of the users, and there is a bucket for each of the users for each of the time intervals.

The calculating means 120 calculates an average position of each of the users for each of the time intervals based on the cell data in the respective bucket (S120).

The determining means 130 determines, for each of the users and for each of the time intervals, a velocity of the respective user (S130). The velocity is calculated as a ratio of a difference of the average position at a time interval subsequent to the respective time interval and the average position of the respective time interval and a duration of the time interval.

The clustering means 140 clusters the users having respective velocities close to the respective velocities of another of the users over the time intervals of the time period in order to obtain respective clusters of the users (S140).

Figure 13:
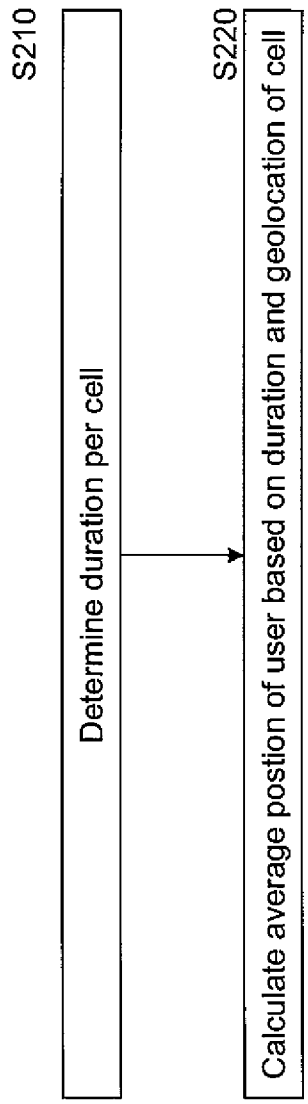
FIG. 13 shows a method according to an example embodiment of the invention.
Figure 12:
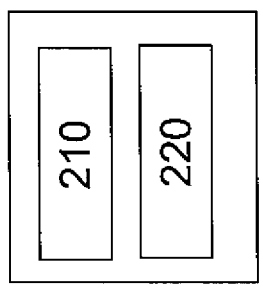
FIG. 12 shows an apparatus according to an example embodiment of the invention.

FIG. 12 shows an apparatus according to an example embodiment of the invention. The apparatus may be a computer or an element thereof. FIG. 13 shows a method according to an example embodiment of the invention. The apparatus according to FIG. 12 may perform the method of FIG. 13 but is not limited to this method. The method of FIG. 13 may be performed by the apparatus of FIG. 12 but is not limited to being performed by this apparatus.

The apparatus comprises determining means 210 and calculating means 220. The determining means 210 and calculating means 220 may be a determining circuitry and calculating circuitry, respectively.

The determining means 210 determines, for each of one or more cells, a respective duration during which a user was located in the respective cell during a predetermined time period (S210).

The calculating means 220 calculates an average location of the user from a weighted average of geolocations of the cells in which the user was located during the time period (S220). The weights of each of the locations is based on the duration during which the user was located in the respective cell.

Figure 14:
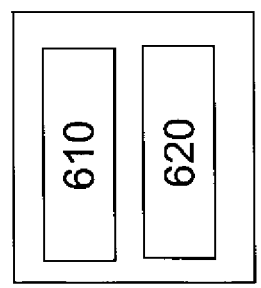
FIG. 14 shows an apparatus according to an example embodiment of the invention.

FIG. 14 shows apparatus according to an embodiment of the invention. The apparatus comprises at least one processor 610, at least one memory 620 including computer program code, and the at least one processor 610, with the at least one memory 620 and the computer program code, is arranged to cause the apparatus to at least perform at least one of the methods according to FIGS. 9, 11, and 13 and related description.

Compared to de Mulder et al., embodiments of the invention use a different approach and distance function, while the basic clustering algorithm described (hierarchical clustering) is similar to the invention's commuting together feature. The paper of de Mulder et al. also does not include user-clustering methods for similar commuting habits.

The concept disclosed by Murat et al. is also very different from embodiments of the invention. The disadvantage in the cell clustering introduced by Murat et al. is that it is losing too much precision in location when combining many cells. The paper of Murat et al. also does not introduce methods for user-clustering methods for similar commuting habits.

Embodiments of the invention may be employed not only in 3GPP networks (such as LTE, LTE-A) but also in other networks where handover data of users are available in the network (e.g. in a GSM network).

One piece of information may be transmitted in one or plural messages from one entity to another entity. Each of these messages may comprise further (different) pieces of information.

Names of network elements, protocols, and methods are based on current standards. In other versions or other technologies, the names of these network elements and/or protocols and/or methods may be different, as long as they provide a corresponding functionality.

A terminal may be any device which may connect to the respective network. For example, a terminal may be a UE, a mobile phone, a laptop, a smartphone, a machine-type communication device, etc.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Embodiments of the invention may be employed fully or partly in the cloud, wherein a resource (e.g. processor, software, memory, network) for the respective task may be shared with other applications.

According to the above description, it should thus be apparent that example embodiments of the present invention provide, for example a computer, or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques, means, entities, units, devices, or methods include, as non-limiting examples, implementations as hardware, software, firmware, special purpose circuits or logic, general purpose hardware or controller or other computing devices, a virtual machine, or some combination thereof.

It should be noted that the description of the embodiments is given by way of example only and that various modifications may be made without departing from the scope of the invention as defined by the appended claims.

The invention claimed is:

1. An apparatus for a telecommunications network, the apparatus comprising:
   at least one processor; and
   at least one memory including computer program code, the at least one processor, with the at least one memory and the computer program code, being arranged to cause the apparatus to perform at least:
   distributing respective location data of a plurality of users of the telecommunications network into respective buckets for each of the plurality of the users, wherein each of the respective location data indicates a location of a respective user of the plurality of the users at a time during a predetermined time period, each of the respective buckets includes a respective time interval of the predetermined time period, the time intervals cover the predetermined time period without overlapping, the time intervals are the same for all of the plurality of the users, and there is a bucket of the respective buckets for each user of the plurality of the users for each of the time intervals;
   calculating, for each pair of users of the plurality of the users and for each of the time intervals, a respective sub-distance between the respective pair of the users based on the respective location data in the respective buckets;
   aggregating, for each of the pairs of the users, the sub-distances over the predetermined time period to obtain a distance between the users of the respective pair;
   clustering the plurality of the users having a closest distance from each other in order to obtain respective clusters of the users; and
   based on the obtained respective clusters of the users, causing the telecommunications network to provide the users with information relevant to their respective locations,
   wherein the sub-distances $d(C_{1,i}, C_{2,i})$ between a user 1 and a user 2 of the users at the time interval i are calculated by one of the following formulas:

$$d(C_{1,i}, C_{2,i}) = 1 - \frac{|C_{1,i} \cap C_{2,i}|}{|C_{1,i} \cup C_{2,i}|} \text{ and}$$

$$d(C_{1,i}, C_{2,i}) = 1 - \frac{|C_{1,i} \cap C_{2,i}|}{\sqrt{|C_{1,i}| \cdot |C_{2,i}|}}$$

wherein $C_{1,i}$ and $C_{2,i}$ denote a set of the respective location data in the bucket of the time interval i of the user 1 and the user 2, respectively, $\cap$ denotes an intersection operator, $\cup$ denotes a union operator, and denotes a cardinality of the respective set.

2. The apparatus according to claim 1, wherein the respective location data are handover data obtained from the telecommunications network and/or wherein the respective location data are data obtained from a positioning system.

3. The apparatus according to claim 1, wherein the clustering is made by agglomerative hierarchical clustering.

4. The apparatus according to claim I, wherein the at least one processor, with the at least one memory and the computer program code, is arranged to cause the apparatus to further perform:
   checking whether a number of the users in the respective cluster is larger than a predetermined number;
   determining a first cell of the telecommunications network where the number of the users in the respective cluster is larger than the predetermined number;
   providing the information to the users via cell broadcast in the first cell when the number of the users in the respective cluster is larger than the predetermined number; and
   providing the information to the users by a dedicated message when the number of the users in the respective cluster is not larger than the predetermined number.

5. The apparatus according to claim 1, wherein the at least one processor, with the at least one memory and the computer program code, is arranged to cause the apparatus to further perform:
   checking whether a number of the users in the respective cluster is larger than a predetermined number;
   determining a second cell of the telecommunications network where the number of the users in the respective cluster is larger than the predetermined number;
   increasing a capacity of the second cell when the number of the users in the respective cluster is larger than the predetermined number.

6. A method for a telecommunications network, the method comprising:
   distributing respective location data of a plurality of users of the telecommunications network into respective buckets for each of the plurality of the users, wherein each of the respective location data indicates a location of a respective user of the plurality of the users at a time during a predetermined time period, each of the respective buckets includes a respective time interval of the predetermined time period, the time intervals cover the predetermined time period without overlapping, the time intervals are the same for all of the plurality of the users, and there is a bucket of the respective buckets for each user of the plurality of the users for each of the time intervals;
   calculating, for each pair of users of the plurality of the users and for each of the time intervals, a respective sub-distance between the respective pair of the users based on the respective location data in the respective buckets;

aggregating, for each of the pairs of the users, the sub-distances over the predetermined time period to obtain a distance between the users of the respective pair;

clustering the plurality of the users having a closest distance from each other in order to obtain respective clusters of the users; and based on the obtained respective clusters of the users, causing the telecommunications network to provide the users with information relevant to their respective locations, wherein the sub-distances $d(C_{1,i}, C_{2,i})$ between a user 1 and a user 2 of the users at the time interval i are calculated by one of the following formulas:

$$d(C_{1,i}, C_{2,i}) = 1 - \frac{|C_{1,i} \cap C_{2,i}|}{|C_{1,i} \cup C_{2,i}|} \text{ and}$$

$$d(C_{1,i}, C_{2,i}) = 1 - \frac{|C_{1,i} \cap C_{2,i}|}{\sqrt{|C_{1,i}| \cdot |C_{2,i}|}}$$

wherein $C_{1,i}$ and $C_{2,i}$ denote a set of the respective location data in the bucket of the time interval i of the user 1 and the user 2, respectively, $\cap$ denotes an intersection operator, $\cup$ denotes a union operator, and |.| denotes a cardinality of the respective set.

7. The method according to claim 6, wherein the respective location data are handover data obtained from the telecommunications network and/or wherein the respective location data are data obtained from a positioning system.

8. The method according to claim 6, wherein the clustering is made by agglomerative hierarchical clustering.

9. The method according to claim 6, further comprising:
checking whether a number of the users in the respective cluster is larger than a predetermined number;
determining a first cell of the telecommunications network where the number of the users in the respective cluster is larger than the predetermined number;
providing the information to the users via cell broadcast in the first cell when the number of the users in the respective cluster is larger than the predetermined number; and
providing the information to the users by a dedicated message when the number of the users in the respective cluster is not larger than the predetermined number.

10. The method according to claim 6, further comprising:
checking whether a number of the users in the respective cluster is larger than a predetermined number;
determining a second cell of the telecommunications network where the number of the users in the respective cluster is larger than the predetermined number;
increasing a capacity of the second cell when the number of the users in the respective cluster is larger than the predetermined number.

11. A computer program product comprising a non-transitory computer-readable medium having a set of instructions which, when executed on an apparatus for a telecommunications network, is configured to cause the apparatus to carry out a method comprising:
distributing respective location data of a plurality of users of the telecommunications network into respective buckets for each of the plurality of the users, wherein each of the respective location data indicates a location of a respective user of the plurality of the users at a time during a predetermined time period, each of the respective buckets includes a respective time interval of the predetermined time period, the time intervals cover the predetermined time period without overlapping, the time intervals are the same for all of the plurality of the users, and there is a bucket of the respective buckets for each user of the plurality of the users for each of the time intervals;

calculating, for each pair of users of the plurality of the users and for each of the time intervals, a respective sub-distance between the respective pair of the users based on the respective location data in the respective buckets;

aggregating, for each of the pairs of the users, the sub-distances over the predetermined time period to obtain a distance between the users of the respective pair;

clustering the plurality of the users having a closest distance from each other in order to obtain respective clusters of the users; and based on the obtained respective clusters of the users, causing the telecommunications network to provide the users with information relevant to their respective locations, wherein the sub-distances $d(C_{1,i}, C_{5,i})$ between a user 1 and a user 2 of the users at the time interval i are calculated by one of the following formulas:

$$d(C_{1,i}, C_{2,i}) = 1 - \frac{|C_{1,i} \cap C_{2,i}|}{|C_{1,i} \cup C_{2,i}|} \text{ and}$$

$$d(C_{1,i}, C_{2,i}) = 1 - \frac{|C_{1,i} \cap C_{2,i}|}{\sqrt{|C_{1,i}| \cdot |C_{2,i}|}}$$

wherein $C_{1,i}$ and $C_{2,i}$ denote a set of the respective location data in the bucket of the time interval i of the user 1 and the user 2, respectively, $\cap$ denotes an intersection operator, $\cup$ denotes a union operator, and |. | denotes a cardinality of the respective set.

12. The computer program product according to claim 11, wherein the respective location data are handover data obtained from the telecommunications network and/or wherein the respective location data are data obtained from a positioning system.

13. The computer program product according to claim 11, wherein the clustering is made by agglomerative hierarchical clustering.

14. The computer program product according to claim 11, the method further comprising:
checking whether a number of the users in the respective cluster is larger than a predetermined number;
determining a first cell of the telecommunications network where the number of the users in the respective cluster is larger than the predetermined number;
providing the information to the users via cell broadcast in the first cell when the number of the users in the respective cluster is larger than the predetermined number; and
providing the information to the users by a dedicated message when the number of the users in the respective cluster is not larger than the predetermined number.

15. The computer program product according to claim 11, the method further comprising:
checking whether a number of the users in the respective cluster is larger than a predetermined number;
determining a second cell of the telecommunications network where the number of the users in the respective cluster is larger than the predetermined number;

increasing a capacity of the second cell when the number of the users in the respective cluster is larger than the predetermined number.

* * * * *

UNITED STATES PATENT AND TRADEMARK OFFICE
CERTIFICATE OF CORRECTION

PATENT NO. : 10,506,380 B2
APPLICATION NO. : 15/825670
DATED : December 10, 2019
INVENTOR(S) : Varga et al.

Page 1 of 1

It is certified that error appears in the above-identified patent and that said Letters Patent is hereby corrected as shown below:

In the Claims

Claim 1, Column 16, Line 12 --|.|-- should be inserted after "and".

Claim 4, Column 16, Line 20 "I" should be deleted and --1-- should be inserted.

Signed and Sealed this
Twenty-fifth Day of February, 2020

Andrei Iancu
*Director of the United States Patent and Trademark Office*